United States Patent [19]

Gryn et al.

[11] 4,279,166
[45] Jul. 21, 1981

[54] FIELD REPLACEABLE ELECTRODE ASSEMBLY FOR MAGNETIC FLOWMETER

[75] Inventors: Felix J. Gryn, Hatfield; James E. Young, Harleysville, both of Pa.

[73] Assignee: Emerson Electric Co., St. Louis, Mo.

[21] Appl. No.: 65,168

[22] Filed: Aug. 9, 1979

[51] Int. Cl.³ ............................................... G01F 1/58
[52] U.S. Cl. ................................................. 73/861.12
[58] Field of Search ................... 73/861.12–861.16, 73/272 R; 310/11; 324/207

[56] References Cited
U.S. PATENT DOCUMENTS 3,813,938   6/1974   Grosch .............................. 73/861.12
3,924,466  12/1975   Medlar .............................. 73/861.12
4,079,626   3/1978   Gardner ............................ 73/861.16
4,117,720  10/1978   Simonsen et al. .................. 73/861.12
4,181,013   1/1980   Wada ................................ 73/861.12

Primary Examiner—Herbert Goldstein
Attorney, Agent, or Firm—Polster, Polster and Lucchesi

[57] ABSTRACT

A field replaceable electrode assembly for a magnetic flowmeter or the like in which an electrode may be readily installed in and sealed relative to a fitting provided on a meter body from the exterior of the meter body. The electrode assembly of the present invention is particularly well-suited for use with flow meter bodies having a sprayed-in-place electrical insulative liner therein.

12 Claims, 3 Drawing Figures

FIELD REPLACEABLE ELECTRODE ASSEMBLY FOR MAGNETIC FLOWMETER

BACKGROUND OF THE INVENTION

This invention relates to an electrode assembly for a magnetic flowmeter or the like, and in particular to such an electrode assembly in which the electrode can be positively sealed in place and in which the electrode can be readily removed and replaced from the exterior of the meter body.

Typically, a magnetic flowmeter includes a meter body adapted to be connected in a flow pipe, the flow through which is to be measured. Magnetic coils are mounted on the meter body and are excited so as to generate a suitable magnetic field across the body. Two meter electrode assemblies are mounted on opposite sides of the body for sensing the voltage induced in a conductive fluid flowing through the magnetic field within the meter body. The voltage is proportional to flow and is suitably amplified to produce a signal indicative of flow.

Each electrode assembly typically includes an electrode and means for mounting the electrode through the meter body into contact with a conductive fluid in the meter body. Because the meter body is typically made of an electrically conductive material, the electrode is electrically insulated from the meter body. Generally, a liner of non-conductive material is provided in the meter body. The liner may be rigid or compliant, and may be made of a number of materials, such as polytetrafluorethylene, polyurethane, butyl rubber, or ceramics. In some designs, the liner does not line the entire flow passage through the meter body, but consists of coated areas in the region of the electrodes. Such a construction is shown in U.S. Pat. No. 3,194,068, to Mannherz et al, for example. In other designs, a relatively thin coating of synthetic resin insulation material is continuously sprayed-in-place on the inside of the meter body. Regardless of the type of liner, however, it is essential that the electrode be positively sealed relative to the meter body.

In some electrode assemblies, such as is shown in U.S. Pat. No. 3,194,068, the electrode has at its inner end a head or skirt part which bears against the liner replacement of the electrode require that the electrode be removed from the interior of the meter body. This necessitates that the meter body be disconnected from the flow pipe system.

In other known electrode assemblies, complicated and expensive constructions were utilized to sealably hold the electrode in place on the meter body and to permit the installation of the electrode from the exterior of the meter body. In U.S. Pat. No. 3,171,990, for example, expansion of a sleeve by a conical electrode is relied upon to seal the electrode.

In certain applications, for example, when measuring sewage flow, the exposed faces of the electrodes must be repeatedly cleaned. To clean the electrode while in place in the meter body, ultrasonic cleaning techniques have been used. In one known version of an electrode adapted to be ultrasonically cleaned, shown in U.S. Pat. No. 3,479,873, to Hermanns, an ultrasonic transducer engages the electrode outside of the meter body and excites the entire electrode so as to clean its inner end which is exposed to the fluid flow within the meter body. In another ultrasonically cleaned electrode arrangement shown in U.S. Pat. No. 3,771,361, to Reznick, the ultrasonic transducer is positioned in a blind bore in the electrode, and bears on a relatively thin wall behind the exposed electrode face. Although this latter approach has substantial advantages, it does not permit the electrode to be removed without disassembling the meter from its flow pipe system.

One of the objects of this invention is to provide an electrode assembly for a magnetic flowmeter or the like in which the electrode may be readily changed from the exterior of the meter body (i.e., a field replaceable electrode).

Another object is to provide such an electrode assembly in which the electrode may be readily and positively sealed with respect to its holder.

Another object is to provide an electrode which may be effectively and efficiently cleaned in situ by ultrasonic cleaning apparatus.

Another object is to provide an electrode assembly which may be readily used with meter bodies having various electrical insulation liners or coatings on the inner surfaces thereof and which is particularly well-suited for use with liners which are sprayed-in-place within the meter body.

Another object is to provide an electrode assembly in which the electrode is positively electrically insulated with respect to the meter body.

Another object is to provide an electrode assembly which is of relatively simple and economical construction and yet is able to withstand relatively high operating pressures without leakage.

Other objects will be in part apparent and in part pointed out hereinafter.

SUMMARY OF THE INVENTION

In accordance with this invention briefly stated, an improved electrode assembly is provided which is adapted to be sealably installed on a meter body of a magnetic flow meter or the like having an opening therethrough for accommodating the electrode assembly. The electrode assembly comprises a fitting having an axial bore therethrough adapted to be sealably secured to the meter body and to extend outwardly therefrom. The electrode assembly further comprises an electrode adapted to be inserted in and to be removed from the bore of the fitting from the exterior of the meter body (i.e., to be field replaceable), the electrode has a flange extending outwardly therefrom. Means is provided for electrically insulating the flange from the fitting. Fastener means is provided which is cooperable with the flange and the fitting for holding the electrode in place within the bore in a sensing position in which it is in sensing relation with fluid flowing through the meter body. Further, means is provided for sealing the electrode with respect to the fitting.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
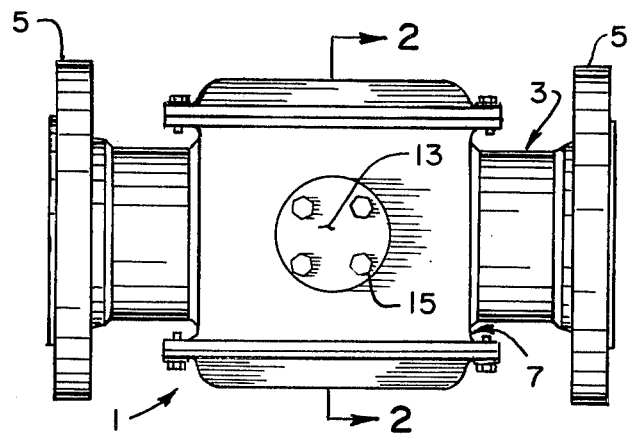
FIG. 1 is a side elevational view of a magnetic flowmeter including the electrode assembly of the present invention.
Figure 2:
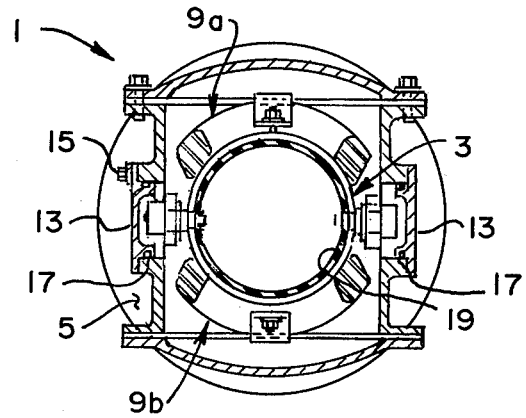
FIG. 2 is a vertical cross sectional view of FIG. 1 taken along line 2—2 illustrating an explosion-proof housing enclosing the magnetic flowmeter on its meter housing, with the magnetic flowmeter being shown to generally include a pair of electro-magnets disposed on opposite sides of the meter body and a pair of electrode assemblies of the present invention diametrically opposed to one another on the meter body between the magnets.

Referring now to the drawings, a magnetic flowmeter of the present invention is indicated in its entirety at 1. The flowmeter is shown to comprise a meter body 3 which may, for example, be a pipe spool having pipe flanges 5 at each end thereof so as to permit the flowmeter to be readily incorporated (i.e., bolted in place) in a flow pipe system through which flows an electrically conductive fluid whose flow rate is to be measured. As is typical, meter body 3 is free from obstructions to the flow of fluid therethrough and thus does not in any significant way interfere with or disturb the flow of fluid therethrough and it does not constitute any substantial restriction or pressure drop to the flow of fluid therethrough. As indicated at 7 (see FIG. 1), an explosion proof housing at least in part surrounds the meter body and encloses the main components of the magnetic flowmeter. As shown in FIG. 2, housing 7 encloses a pair of coil magnets 9a and 9b which are held in place on opposite sides of the meter body and which are maintained firmly in engagement with the exterior of the meter body or pipe spool. These coils constitute electromagnets which generate a magnetic field of desired magnetic flux and characteristics within the meter body and in the interior thereof. Preferably, the meter body is made of a selected ferro-magnetic material and it serves as a core or return path for the magnetic field generated by the magnets. The magnets may be driven in any number of well known manners which are not per se a part of the present invention and thus are not herein described in detail.

As further shown in FIG. 2 magnetic flowmeter 1 includes a pair of electrode assemblies 11 of the present invention with the individual electrode assemblies being diametrically opposed to one another on opposite sides of the meter body and being essentially located midway between magnets 9a and 9b. Housing 7 is provided with a pair of removable cover plates 13, one for each electrode assembly 11, which permit service personnel to access electrode assemblies 11 located immediately behind these cover plates. The cover plates are securely bolted to housing 7 by bolts 15 and are sealed relative thereto by means of O-rings 17, as shown in FIG. 2.

As is further shown in FIG. 2, an electrical insulating liner 19 of suitable electric insulation material is provided on the inside of meter body 3. As shown, liner 19 covers the entire inner surface of the meter body. However, it will be understood that in other magnetic flowmeter designs, it may only be necessary to cover the inside of the meter body proximate the location of electrode assemblies 11. More specifically, insulating liner 19 is a suitable synthetic resin material, preferably a relatively thin coating of sprayed-in-place electrical insulation material. For example, liner 19 may be a spray coating of suitable synthetic resin electrical insulation material, such as a polyvinylidene fluoride available from Pennwalt Chemicals Corporation, Philadelphia, Pa., under their trade designation Kynar. This coating is uniformly applied (e.g., sprayed) over the entire inner surface of the meter body. This liner is applied to the inner surface of the pipe spool constituting the meter body in such manner as to prevent the leakage or flow of fluid between the liner and the meter body. A hole or opening (see FIG. 3) is are provided in opposite walls of the meter body so as to receive a corresponding electrode assembly 11 of the present invention.

Figure 3:
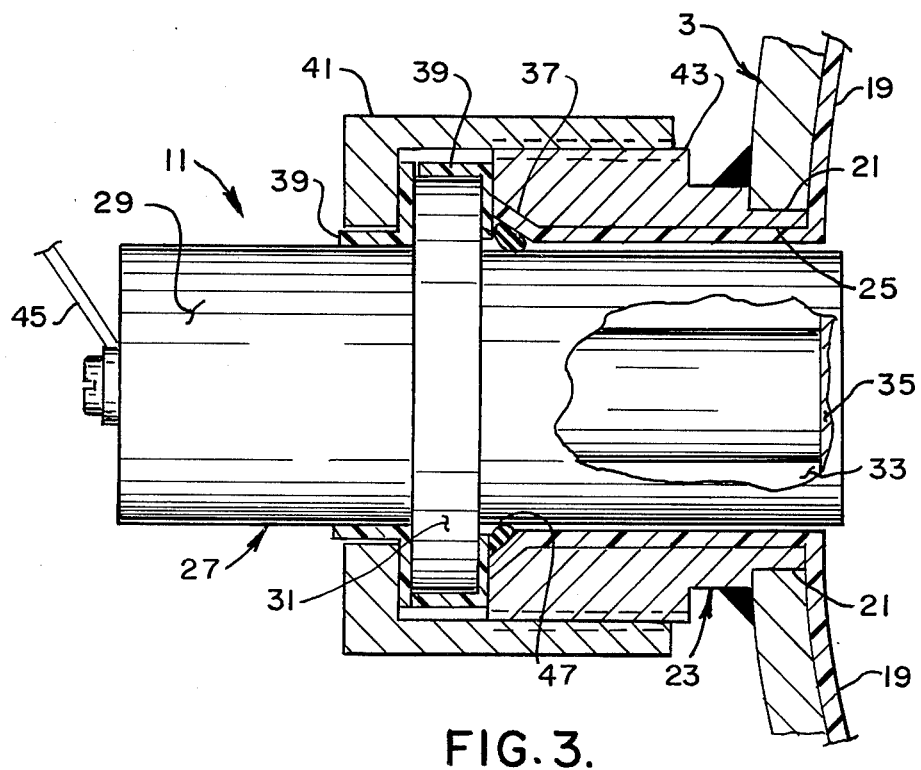
FIG. 3 is an enlarged longitudinal cross-sectional view of the electrode assembly of the present invention.

Generally, an electrode assembly 11 comprises a fitting 23 which is sealably secured (e.g., welded) to meter body 3 in register with opening 21. The fitting has a bore 25 extending longitudinally therethrough. An electrode, as generally indicated at 27, is received within bore 25 of the fitting with one end of the electrode (i.e., its inner end) being in sensing relation with fluid flowing through the meter body when the electrode is in its installed position (as best shown in FIG. 3). As shown in FIG. 3, liner 19 is a continuous coating of electrical insulation material applied to the inner surface of the meter body. It will be particularly noted that this continuous liner extends up into bore 25 of fitting 27 and thus electrically insulates the electrode from the fitting.

Electrode 27 is made of suitable electrically conductive material and it has a shank portion 29 and an enlarged flange 31 intermediate its ends. A blind bore 33 extends longitudinally through the electrode from its outer end toward its inner closed end 35. As shown, the inner end 35 of the electrode is relatively thin for purposes as will appear.

Fitting 23 has a tapered seat 37 at its outer end. A pair of angle-shaped electrical insulating rings or members 39 surround flange 31 of electrode 27 and electrically insulate it from fitting 23 when the electrode is installed in the fitting. Further, these insulating members also electrically insulate the electrode from a retaining cap nut 41 which fits over flange 31 and which engages threads 43 on fitting 23 so as to securely hold the electrode in place within fitting 23. The outer end of electrode 27 extends out through the center of retaining cap nut 41 and an electrode lead 45 is attached to the electrode. A compressible O-ring 47 surrounds shank 29 adjacent flange 31 on the electrode with this O-ring being sealably engageable with the electrode shank and with seat 37 when cap nut 41 is tightened so as to force the electrode inwardly with respect to fitting 27 and to seal the electrode with respect to the fitting.

In accordance with this invention, electrode assemblies 11 are readily field replaceable without the necessity of access to the electrode from the interior of meter body 3. In electrode assembly 11, electrode 27 may be replaced by unscrewing cap nut 41 from fitting 23 and by pulling the electrode from bore 25 of the fitting. Upon installation, electrode 27 is merely inserted into the bore of the fitting and the cap nut is tightened. Thus, the outer end 35 of the electrode is brought into sensing relation with fluid flowing through the meter body and its O-ring seal 37 is compressed so as to positively seal the electrode with respect to the fitting.

In view of the above, it will be seen that other objects and features of the invention are achieved and other advantageous results are attained.

As various changes could be made in the above constructions without departing from the scope of the invention, it is intended that all matter contained in the description or shown in the accompanying drawings shall be interpreted as illustrative and not in a limiting sense.

We claim:

1. An electrode assembly adapted to be sealably installed on a meter body or the like, said meter body having a liner on the inside thereof of suitable electrical insulation material and an opening therethrough for accommodating said electrode assembly, said electrode assembly comprising a fitting adapted to be sealably secured to said meter body and to extend outwardly therefrom, said fitting having an axial bore therethrough and a tapered seat at the exterior end thereof, said liner being a continuous coating of a suitable applied-in-place electrical insulating material covering the interior of said meter body adjacent said opening and extending into said axial bore of said fitting, said assembly further comprising an electrode adapted to be inserted in and removed from said bore from the exterior of said meter body, said electrode having a flange extending outwardly therefrom, means for electrically insulating said flange from said fitting, fastener means cooperable with said flange and said fitting for holding said electrode within said bore in a sensing position in which it is in sensing relation with fluid flowing through said meter body, and means in said tapered seat for sealing said electrode with respect to said fitting.

2. An electrode assembly as set forth in claim 1 wherein said electrode seal means comprises a compressible seal between said electrode and said fitting.

3. An electrode assembly as set forth in claim 1 wherein said fastener means is a cap nut which fits over said flange on said electrode and which threadably engages said fitting thereby to hold said flange captive between said fitting and said cap nut.

4. An electrode assembly as set forth in claim 3 wherein said electrical insulator means comprises one or more insulating member disposed between said cap nut and said flange and between said flange and said fitting thereby to electrically isolate said flange from said fitting.

5. An electrode assembly as set forth in claim 1 wherein said continuous coating is sprayed in place.

6. An electrode assembly as set forth in claim 5 wherein said coating is a polyvinylidene fluoride resin material.

7. An electrode assembly as set forth in claim 5 wherein said fitting is welded to said meter body.

8. An electrode assembly as set forth in claim 5 further comprising electrical insulator means for electrically insulating said electrode from said fitting.

9. An electrode assembly as set forth in claim 5 wherein said electrode has a shank adapted to be received within said bore of said fitting, said flange extending from said shank, said electrode assembly further comprising a cap nut constituting said fastening means adapted to threadably engage said fitting for securing said flange between said cap in said fitting.

10. An electrode assembly as set forth in claim 9 wherein said electrical insulator means comprises one or more insulating members disposed between said cap and said flange and between said flange and said fitting.

11. An electrode assembly as set forth in claim 10 wherein said seal means comprises a compressible seal between said electrode and said fitting.

12. An electrode assembly as set forth in claim 1 wherein said continuous coating of insulating material extends into said seat.

* * * * *